United States Patent [19]
Nishida et al.

[11] Patent Number: 6,155,621
[45] Date of Patent: Dec. 5, 2000

[54] AUTOMOTIVE ROLL-UP PARTITIONING SYSTEM

[75] Inventors: Takao Nishida, Takarazuka; Takao Hanatani, Ibaraki, both of Japan

[73] Assignee: Ashimori Kogyo Kabushiki Kaisha, Japan

[21] Appl. No.: 09/390,382

[22] Filed: Sep. 3, 1999

Related U.S. Application Data

[63] Continuation of application No. PCT/JP98/00008, Jan. 5, 1998.

[51] Int. Cl.[7] .................. B60R 5/04; B60R 21/06
[52] U.S. Cl. .............. 296/24.1; 296/37.7; 296/37.16; 280/749
[58] Field of Search .............................. 296/24.1, 68.1, 296/63, 69, 34, 37.16, 37.7; 280/749

[56] References Cited

U.S. PATENT DOCUMENTS

| | | | |
|---|---|---|---|
| 5,288,122 | 2/1994 | Pilhall | 296/24.1 |
| 5,551,726 | 9/1996 | Ament | 280/749 |
| 5,971,433 | 10/1999 | Ament et al. | 280/749 |

FOREIGN PATENT DOCUMENTS

| | | |
|---|---|---|
| 9-118197 | 5/1997 | Japan . |
| 9-290691 | 11/1997 | Japan . |
| 10-24790 | 1/1998 | Japan . |

Primary Examiner—Joseph D. Pape
Assistant Examiner—Greg Blankenship
Attorney, Agent, or Firm—Morrison Law Firm

[57] ABSTRACT

An automotive roll-up partitioning system includes a pair of roll-up devices providing a pair of partitioning members to separate one volume of a vehicle from a second volume. The partitioning members protect the passengers from forward moving of baggage caused by, for example, a rapid deceleration of the automobile. Each roll up device includes a lock mechanisms detecting that the partitioning member is rapidly pulled out, stopping the rotation of a roll-up shaft of the roll-up device. With a partitioning system so designed, the seat backs can be independently reclined and positioned upright while the partitioning members maintain their protective feature.

10 Claims, 14 Drawing Sheets

AUTOMOTIVE ROLL-UP PARTITIONING SYSTEM

This application is a continuation of PCT/JP98/00008 filed Jan. 5, 1998, published as WO/99/35006 on Jul. 15, 1999.

BACKGROUND OF THE INVENTION

The present invention relates to an automotive roll-up partitioning system. More specifically, the present invention relates to a device having a lock mechanism that stops the rotation of a take-up shaft by detecting when a partitioning member is rapidly pulled out.

Automobiles such as hatchbacks, vans, station wagons, and the like, use partitioning systems to protect passengers from baggage by using a partitioning member to stop baggage when it moves toward the passenger compartment due to, for example, the sudden application of the vehicle brakes. The partitioning member is a net, or the like, that expands to separate the baggage area from the passengers compartment. Alternatively, the partitioning member expands to cover the baggage in the baggage area.

In these conventional partitioning systems, the partitioning member does not loosen, thus reliably and safely preventing baggage from moving even if a large load is applied to the partitioning member.

Japanese patent publication number 6-2454, discloses a partitioning system including a roll-up device, a tonneau cover, and a partitioning member. The roll-up device is mounted behind the seat back. The ends of the roll-up device are fixed to the side walls of the vehicle. The tonneau cover is rolled up by the roll-up device. The partitioning member is integrally formed with the leading end of the tonneau cover. The tonneau cover is pulled rearward following the partitioning member. The leading end of the tonneau cover engages with the vehicle toward the rear of the baggage area, thus providing a tonneau cover device. The partitioning member can also be pulled upward by itself from the roll-up device with the leading end of the partitioning member engaging with the ceiling of the automobile. The base of the partitioning member engages with an engagement piece of the roll-up device. This allows the partitioning member to be stretched taut, preventing it from being pulled out from the roll-up device. This conventional structure keeps baggage in the baggage area from moving toward the passenger compartment.

In this type of conventional partitioning system, however, the space in the baggage area in which baggage can be loaded is restricted due to the need to fix the ends of the roll-up device to the side walls of the automobile and to mount the roll-up device behind the seat back. This prevents the passenger from reclining the seat back. To maximize baggage space, the roll-up device can be fixed directly to the seat back. In this case, the ends of the partitioning member are engaged to the roof of the automobile and the roll-up device, respectively, thus setting up the partitioning member so that it is unable to be pulled out from the roll-up device. This, however, also prevents the seat backs from being reclined. Since providing a taut partitioning member requires engaging the ends of the partitioning member to engagement pieces on the ceiling and the roll-up device, the process of setting up the partitioning member becomes very tedious.

Japanese laid-open patent publication number 5-44381 describes a partitioning system that includes: a roll-up device having a rotatable roll-up shaft kept pulled in a direction of retraction; a partitioning member rolled up by the roll-up device; and a lock mechanism stopping the extraction of the partitioning member, upon detecting rapid pulling out of the partitioning member. This lock mechanism includes a roller member having approximately the same length as the roll-up shaft. The partitioning member extending from the roll-up shaft is turned around the roller member and upwardly extended. If the partitioning member is rapidly pulled upward and a large load is applied to the roller member, the roller member stops rotating. The friction between the roller member and the partitioning member then stops the extraction of the partitioning member. The taut state of the partitioning member prevents baggage in the baggage area from moving toward the passenger compartment.

With the conventional lock mechanism described above, the ends of the roller member are slidably fitted to bearings formed as vertical slots on the casing of the roll-up device. This structure provides rotatable support for the roller member. When a large load is applied to the roller member and the roller member moves slightly upward, engagement sections formed at the ends of the roller member engage with engagement sections formed on the upper ends of the bearings, stopping the rotation of the roller member.

In this conventional partitioning system, the lock mechanism stops the rotation of the roller member. The friction between the roller member and the partitioning member stops the extraction of the partitioning member. Thus, when a large load is applied to the partitioning member, it is possible for the partitioning member to slide against the roller member so that the partitioning member is pulled out, thus reducing the protection provided for the passengers. Furthermore, in this conventional lock mechanism, locking is achieved by slidably fitting the ends of the roller member to the bearings formed on the roll-up device casing, thus providing rotatable support. This tends to result in wear on the ends of the roller member and on the bearings, which shortens the lifespan of the roll-up device. Finally, the roll-up device tends to be large since the roller member of the lock mechanism must be disposed on the roll-up device.

OBJECTS AND SUMMARY OF THE INVENTION

It is an object of the present invention to provide an automotive roll-up device which overcomes the foregoing problems.

It is a further object of the present invention to provide an automotive roll-up partitioning system that reliably protects passengers from baggage in the baggage area.

It is another object of the present invention to provide an automotive roll-up partitioning system that allows seat backs to be reclined.

It is still another object of the present invention to provide an automotive roll-up system that allows the partitioning member to be easily set up.

It is a further object of the present invention to provide an automotive roll-up system that provides a long lifespan for the lock mechanism.

It is another object of the present invention to provide an automotive roll-up system that provides a compact roll-up device.

It is a further object of the present invention to provide an automotive toll-up system that prevents the lock mechanism from locking when the partitioning member is completely rolled up.

The automotive roll-up partitioning system according to the present invention provides an automotive roll-up partitioning system used to protect passengers from baggage loaded in a baggage area of a vehicle. The partitioning system includes a roll-up device, a casing holder, a partitioning member, and a lock mechanism. The roll-up device includes a rotatable roll-up shaft biased to rotate in the direction of retraction and the casing holder rotatably supporting the roll-up shaft. The partitioning member includes a base, end fixed to the roll-up shaft and is capable of being rolled up onto the roll-up shaft. A lock mechanism stops rotation of the roll-up shaft, upon detecting rapid pulling out of the partitioning member.

In the partitioning system of the present invention, the partitioning member is drawn out from the roll-up device attached to a seat back, the ceiling of the vehicle, or the like. The leading end of the partitioning member is removably connected to the ceiling of the vehicle or the seat back of the seat. This sets up the partitioning member so that the baggage area of the vehicle and the passengers compartment are separated. With the partitioning member set up, baggage from the baggage area that moves forward due to the rapid deceleration of the vehicle or the like is stopped by the partitioning member. If the partitioning member is drawn out rapidly from the roll-up device, the lock mechanism detects the rapid extraction of the partitioning member and immediately stops the rotation of the roll-up shaft. This stops the partitioning member from being drawn out from the roll-up device. The resulting tautness of the partitioning member protects the passengers from the baggage moving forward.

The partitioning system of the present invention uses a lock mechanism to stop the rotation of the roll-up shaft when rapid extraction of the partitioning member is detected. As a result, the drawing out of the partitioning member from the roll-up device is reliably halted right after the rapid extraction of the partitioning member is detected. This reliably prevents the baggage in the baggage area from moving toward the passengers. Furthermore, since the lock mechanism does not activate unless the partitioning member is rapidly pulled out, the partitioning member can be freely pulled out under normal conditions.

A unit containing the lock mechanism, the partitioning member, and the roll-up device as described above can also be used for an automotive roll-up partitioning system attached to each of seat backs of a pair of laterally adjacent divided seats. In this embodiment of the present invention, it is desirable to use a stay to integrally support the leading ends of the pair of partitioning members. As with the above, in this type of partitioning system, the passengers seated at the pair of divided seats are protected from baggage.

Since the lock mechanism is usually not activated, the pair of partitioning members are independently adjustable. Thus, after setting up the partitioning members, the pair of seat backs can be independently reclined.

In the automotive roll-up partitioning system described above, it is also possible for the lock mechanism to include inner teeth formed integrally with the casing holder, a lock arm base fixed to one end of the roll-up shaft, a lock arm pivotably supported on the lock arm base at a position eccentric from the axis of the roll-up shaft, the lock arm having a claw engagable with the inner teeth, a sensor spring biasing the lock arm in a direction in which the lock arm does not engage with the inner teeth, and an inertia mass applying an inertia force to the lock arm in a direction of engagement between the claw and the inner teeth when the partitioning member is rapidly pulled out. The inertia mass may be an independent element attached to the lock arm or one integrated with the lock arm.

When the partitioning member is drawn out under normal conditions, the roll-up shaft, the lock arm base, the inertia mass, and the lock arm rotate integrally. If a rapid withdrawal of the partitioning member takes place, the roll-up shaft rotates rapidly. There is a rotation delay in the inertia mass relative to the roll-up shaft. This delay results in an inertia force being applied to the lock arm in the direction of engagement between the claw of the lock arm and the inner teeth. The lock arm then pivots in opposition to the sensor spring and the claw engages the inner teeth, stopping the pulling out of t:he partitioning member. When the roll-up shaft is rotated in the direction of retraction from such a state, the engagement between the claw and the inner teeth is released. The lock arm pivots due to the sensor spring to return to its normal position.

When this lock mechanism is used, the lock mechanism provides a very simple and compact structure and mechanism. The lock mechanism also provides lower production costs. Since the lock mechanism can be disposed on one end of the roll-up device, the roll-up device can be made very compact. In the roll-up device of the present invention, there is almost no wear in the different elements, resulting in longer lifespan for the lock mechanism.

It is also desirable to have a cut-out formed in at least one portion along the perimeter of the inner teeth of the casing holder. The cut-out has a prescribed length and is adopted to be positioned facing the claw when the partitioning member is completely rolled up. This structure prevents the claw of the lock arm from engaging with the inner teeth when the partitioning member is completely rolled up, and therefore the lock mechanism is not activated when the partitioning member is completely rolled up.

If the automotive roll-up partitioning system is to be used on a pair of seat backs, it is possible for the pair of partitioning members to be formed from a single partitioning member on which is formed a longitudinal slit, extending near the leading end of the partitioning member, aligned with the midpoint position between the pair of roll-up devices. In this case, the pair of partitioning members are formed simply by making a slit in a single partitioning member, thus providing a simple production process. Also, attaching a stay to the leading ends of the pair of partitioning members can be easily performed.

When the automotive roll-up partitioning system is disposed on the pair of seat backs, a stay can be used to integrally support the leading ends of the pair of partitioning members. The stay is removably engaged to an engagement section on the vehicle. The leading ends of the pair of partitioning members are attached to a pair of removably connected attachment sections. When the pair of attachment sections are engaged with the engagement section of the vehicle, the pair of partitioning members may partially overlap. In this type of partitioning system, the partial overlap of the pair of partitioning members minimizes the gap between the pair of partitioning members, thus improving the protection provided for the passengers from the baggage. Furthermore, when the stay is disengaged from the engagement sections of the vehicle, the pair of attachment sections can be separated so that each attachment sections is integrally supported by a seat back. Thus, the seat backs can be reclined independently if the partitioning system is not being used, and only one partitioning member can be set up if necessary.

Furthermore, for partitioning systems in which a cut-out is formed along the inner teeth of the casing holder, it is possible to have the roll-up device include an attachment mechanism to which a casing holder is attached. The attachment mechanism includes a first attachment section for attaching the casing holder at a prescribed first orientation, and a second attachment section for attaching the casing holder at a prescribed second orientation offset by a prescribed angle around the axis of the roll-up axis relative to the first orientation.

In setting up the partitioning system, if the claw of the lock arm faces away from the cut-out when the casing holder is put in the first orientation by being attached to the first attachment section of the attachment mechanism, the casing holder can be put in the second orientation by being attached to the second attachment section. Thus, the claw of the lock arm is reliably faces the cut-out.

Briefly stated, the present invention provides an automotive roll-up partitioning system including a pair of roll-up devices providing a pair of partitioning members to separate a baggage area of a vehicle from a passenger compartment. The partitioning members protect the passengers from forward moving baggage caused by, for example, a rapid deceleration of the automobile. The roll up devices includes a pair of lock mechanisms detecting when the pair of partitioning members are rapidly pulled out, stopping the rotation of a roll-up shaft of the roll-up device. With a partitioning system so designed, the seat backs can be independently reclined and positioned upright while the partitioning members maintain their protective feature.

According to an embodiment of the present invention, there is provided an automotive roll-up partitioning system comprising a roll-up device having a rotatable roll-up shaft biased to rotate in a direction of retraction, a casing holder rotatably supporting the roll-up shaft, a partitioning member having a base end fixed to the roll-up shaft and being rolled up thereon and extended therefrom, and a lock mechanism stopping rotation of the roll-up shaft upon detecting a rapid pulling out of the partitioning member, thereby stopping the pulling out of the partitioning member.

According to a feature of the present invention, there is provided an automotive roll-up partitioning system comprising a pair of roll-up devices each having a rotatable roll-up shaft biased to rotate in a direction of retraction, the pair of roll-up devices being attached to a pair of adjacent seat backs divided along a lateral direction of a vehicle, a casing holder rotatably supporting each of the roll-up devices, a pair of partitioning members having a base end fixed to each of the roll-up shafts, the pair of partitioning members being rolled up onto and extended from the roll-up shafts, and a lock mechanism stopping rotation of the roll-up shaft upon detecting a rapid pulling out of the partitioning member, thereby stopping the pulling out of the partitioning member.

According to another embodiment of the present invention, there is provided a locking mechanism for locking a rotatable roll-up shaft having a material rolled thereupon, comprising a casing holder rotatably supporting the roll-up shaft, inner teeth integrally formed with the casing holder, a lock arm base attached to a first end of the roll-up shaft, a lock arm pivotably supported on the lock arm base at a position eccentric from an axis of the roll-up shaft, a claw formed in a portion of the lock arm engagable with the inner teeth, a sensor spring biasing the lock arm base in a direction such that the claw does not engage with the inner teeth, and an inertia mass applying an inertia force to the lock arm in a direction of engagement between the claw and the inner teeth when the material is rapidly pulled out from the roll-up device.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
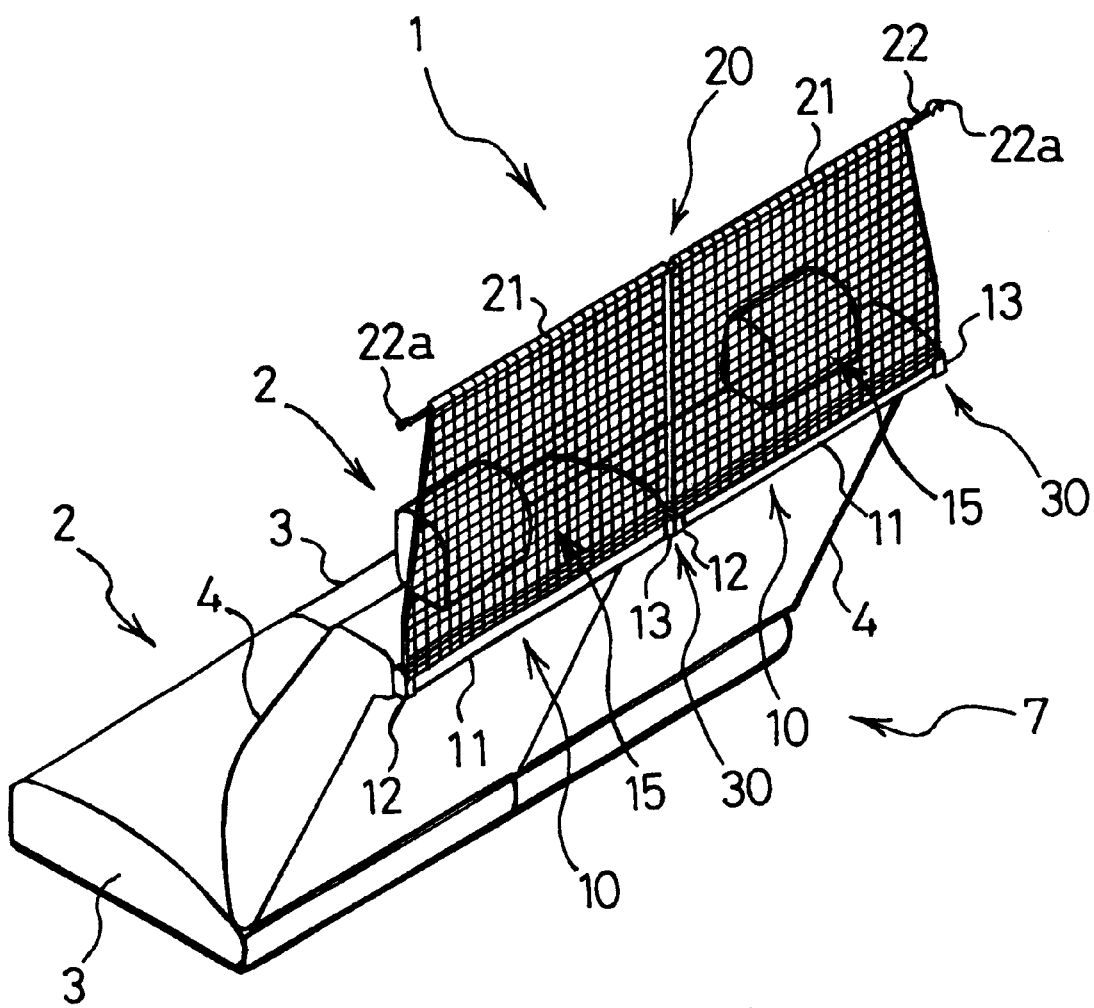
FIG. 1 is a perspective drawing of the rear seat and the partitioning system of an automobile according to an embodiment of the present invention.
Figure 2:
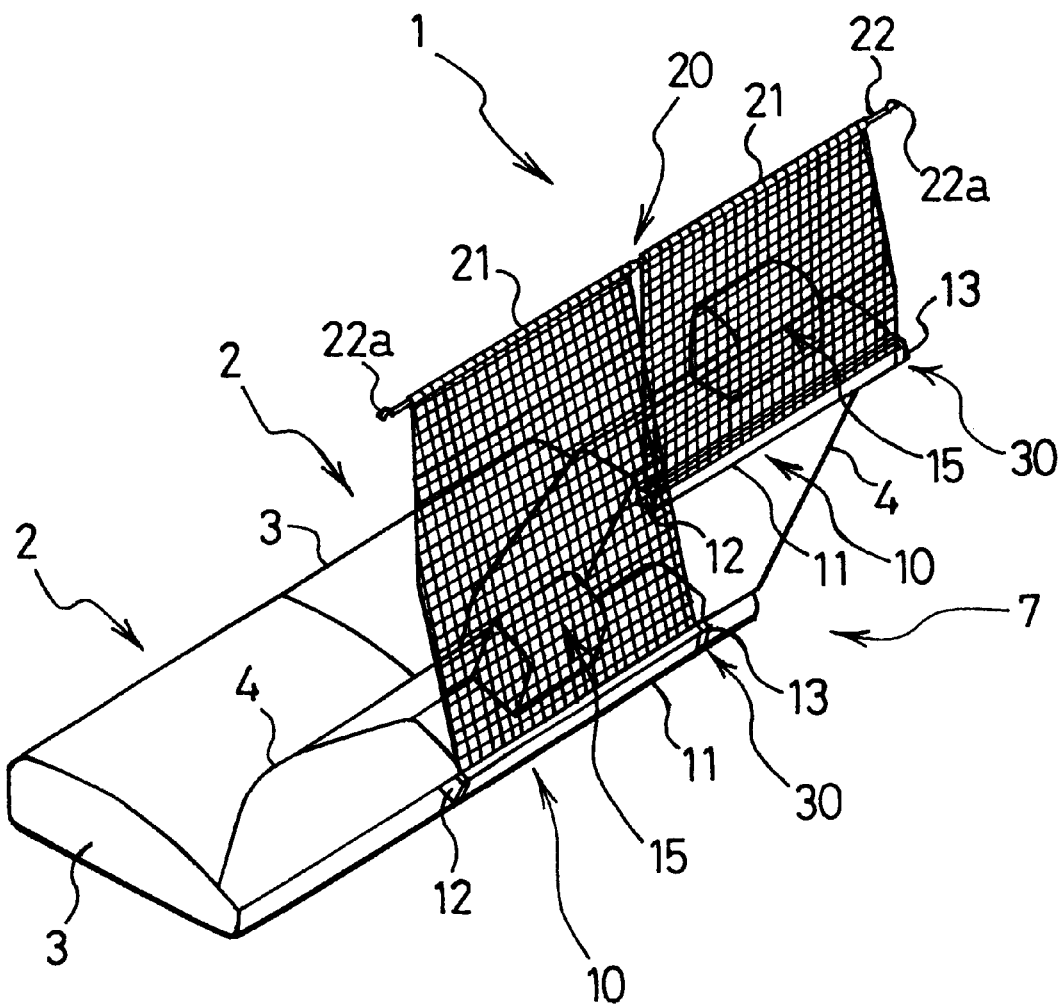
FIG. 2 is a perspective drawing of the partitioning system and the rear seat of FIG. 1 with one seat back reclined.
Figure 3:
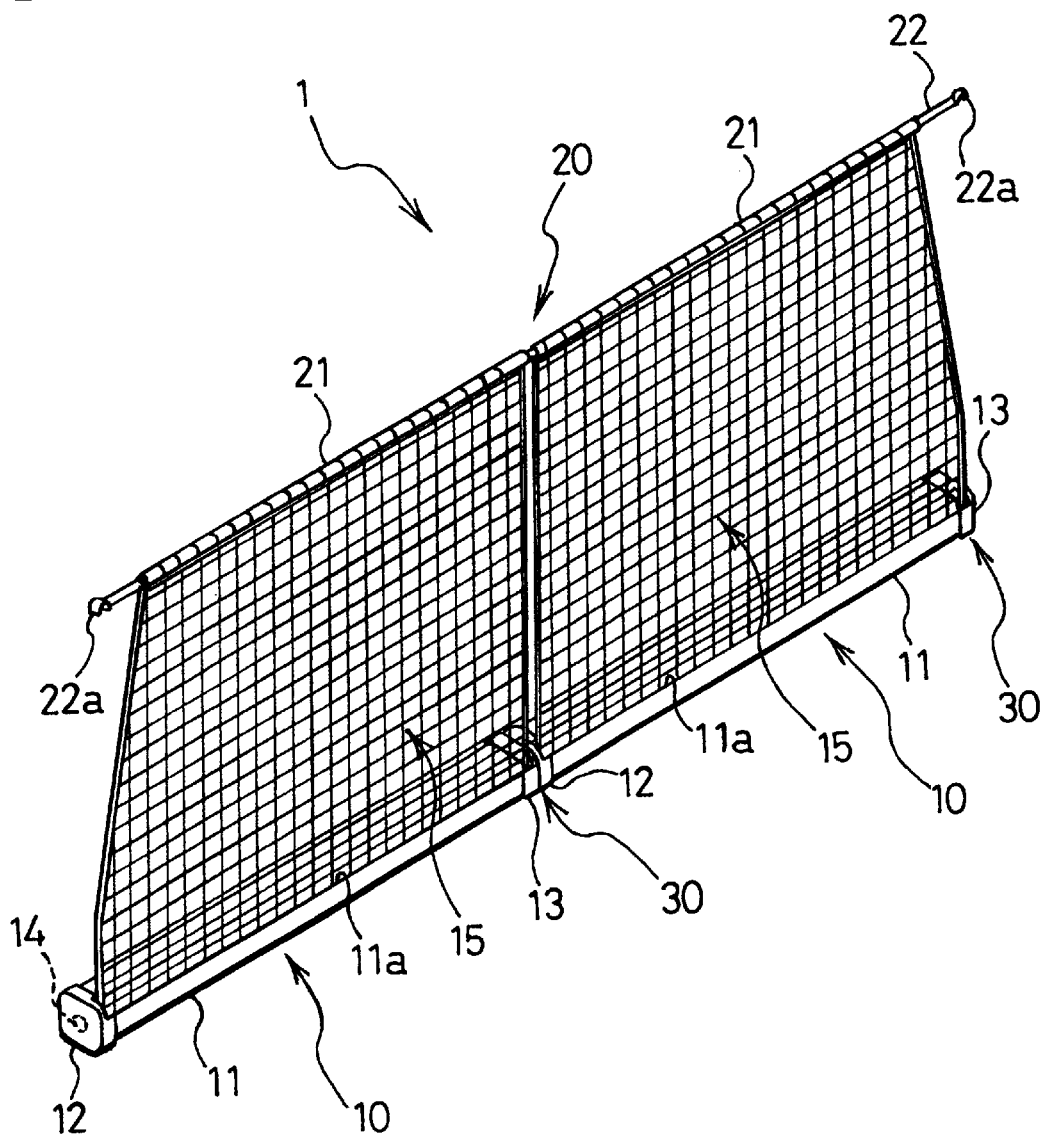
FIG. 3 is a perspective drawing of the partitioning system of FIG. 1.

Referring to FIGS. 1 through 3, an automobile according to a first embodiment of the present invention includes divided seats 2, preferably divided into two sections at a 6:4 ratio with the sections disposed laterally adjacent to each other in the cabin. Each divided seat 2 includes a seat cushion 3 and a seat back 4. Each of the seat backs 4 are independently able to recline. A baggage area 7 is located behind the pair of seat backs 4 to allow baggage to be loaded. A partitioning system 1 includes a pair of roll-up devices 10, each of which is attached to a seat back 4. A pair of partitioning members 15 are rolled up by roll-up device 10. A stay 20 is fixed to the leading ends of the pair of partitioning members 15. A pair of lock mechanisms 30 are located, preferably, on the right ends of each roll-up device 10.

Each roll-up device 10 includes a cylindrical member 11 having a slit 11a laterally extending in relation to the cabin. A pair of casing holders 12 and 13 are fixed to the left and right ends of cylindrical member 11. A roll-up shaft 14 is rotatably supported in cylindrical member 11 by the pair of casing holders 12 and 13. A torsion spring (not shown in the figure) maintains tension on roll-up shaft 14 in the direction of retraction. The base end of partitioning member 15 is fixed to roll-up shaft 14, so that a tension is maintained on partitioning member 15 in the direction of retraction. While not shown in the figure, the pair of roll-up devices are screwed to the back of the seat backs 4 using attachment pieces or the like.

The pair of partitioning members 15, fixed to roll-up shafts 14 so that roll-up shafts 14 can be rolled up, are preferably formed from a high-strength fiber or a high-strength metal cloth or net. The leading ends of the pair of partitioning members 15 are integrally supported by stay 20. Stay 20 includes a pair of cylindrical attachment sections 21, each of which attaches to the leading end of partitioning member 15. A shaft 22 fits inside the pair of attachment sections 21. A pair of hooks 22a is located at the ends of shaft 22. Hooks 22a are engaged with and disengaged from a pair of engagement sections (not shown in the figure) on the ceiling of the vehicle.

Lock mechanisms 30, when detecting rapid pulling out of partitioning members 15, stops rotation of roll-up shaft 14.

Figure 4:
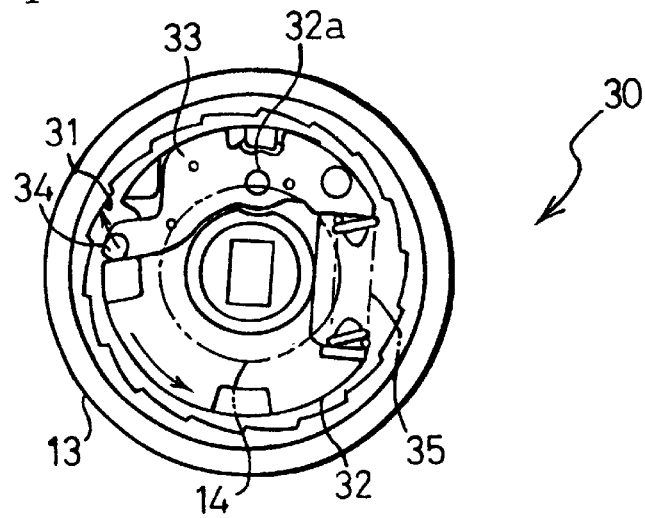
FIG. 4 is a detail drawing of the lock mechanism in an unlocked state.
Figure 5:
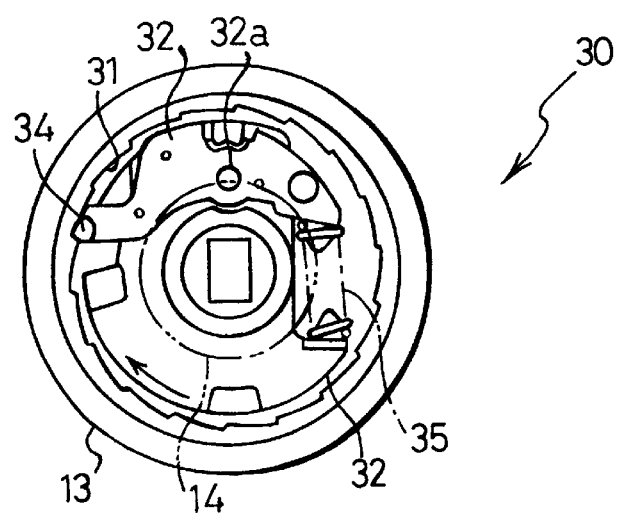
FIG. 5 is a detail drawing of the lock mechanism in a locked state.
Figure 6:
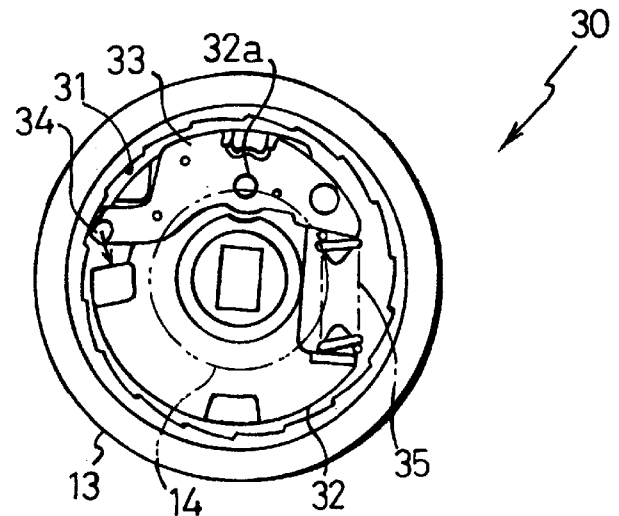
FIG. 6 is a detail drawing of the lock mechanism immediately after being unlocked.

Referring to FIGS. 4 through 6, lock mechanisms 30 include a casing holder 13 having inner teeth 31. A lock arm base 32 is fixed to one end of roll-up shaft 14. A lock arm 33 is rotatably supported by a pin 32a provided on lock arm base 32 at a position eccentric from the axis of roll-up shaft 14. Lock arm 33 includes a claw 34 engagable with inner teeth 31 of casing holder 13. A sensor spring 35 biases lock arm base 32 in the direction of non-engagement between lock arm 33 and internal teeth 31. Lock arm 33 is preferably metallic and has a prescribed mass. Lock arm 33 also includes an inertia mass so that when partitioning member 15 is rapidly pulled out, inertia force by the inertia mass is applied to lock arm 33. This inertia causes claw 34 to engage with inner teeth 31.

When partitioning member 15 is pulled out normally, roll-up shaft 14, lock arm base 32, and lock arm 33 rotate integrally around an axis of roll-up shaft 14 in the direction indicated by the long arrow in FIG. 4. If partitioning member 15 is rapidly pulled out, causing lock arm base 32 to be rotated abruptly with roll-up shaft 14, lock arm 33 is left behind. This is because inertia force is applied to lock arm 33 in the direction of engagement between claw 34 and inner teeth 31. As a result, lock arm 33 is pivoted around pin 32a in the direction indicated by the short arrow in FIG. 4 in opposition to sensor spring 35.

Referring to FIG. 5, claw 34 engages with inner teeth 31 of casing holder 13 stopping the rotation of roll-up shaft 14. This halts the pulling out of partitioning member 15. If roll-up shaft 14 is then rotated in the direction of retraction (in the direction indicated by the arrow in FIG. 5), engagement between claw 34 and inner teeth 31 is released, allowing lock arm 33 to pivot due to sensor spring 35, restoring the normal position as shown in FIG. 4.

The following is a description of how partitioning system 1 operates.

The pair of partitioning members 15 is pulled out from the pair of roll-up devices 10 attached to seat backs 4. Hooks 22a of stay 20 are engaged with the engagement sections on the ceiling of the vehicle.

Referring again to FIG. 1, this sets up the pair of partitioning members 15 so that baggage area 7 is partitioned off from the passengers compartment. If the pair of partitioning members 15 is set up and the baggage that is loaded in baggage area 7 moves forward due to, for example, sudden deceleration, a load is applied to partitioning members 15. As partitioning members 15 are rapidly pulled out from the corresponding roll-up devices 10, lock mechanisms 30 detect the rapid pulling out of partitioning members 15, and stops the rotation of roll-up shaft 14. This prevents partitioning members 15 from being pulled out from roll-up devices 10. The resulting taut state of partitioning members 15 prevents the baggage in baggage area 7 from moving toward the passenger compartment, protecting the passengers from the moving baggage.

With partitioning system 1 described above, the pair of lock mechanisms 30 detect that the pair of partitioning members 15 are pulled out rapidly, and stop the rotation of roll-up shaft 14. Thus, the pulling out of partitioning members 15 from roll-up devices 10 is reliably halted immediately after the rapid pulling out of partitioning members 15 from roll-up devices 10. Since lock mechanism 30 is not activated unless partitioning members 15 are rapidly pulled out, the pair of partitioning members 15 can be freely pulled out under normal conditions. Thus, once partitioning members 15 are set up, each of the pair of seat backs 4 can be independently reclined.

Lock mechanisms 30 are designed with very simple and compact structures and mechanisms, giving rise to minimal production costs. Also, since lock mechanism 30 can be disposed at only one end of roll-up device 10, roll-up device 10 can be designed very compactly. Since there is almost no wear in the various members, lock mechanism 30 have a long lifespan. In lock mechanism 30, it is also possible to have an inertia mass disposed separately from lock arm 33. The inertia force of the inertia mass would be applied to lock arm 33 in the direction of engagement between claw 34 and inner teeth 31 when partitioning members 15 are rapidly pulled out.

The following is a description of alternative embodiments of the present invention. Like numerals will be assigned to like elements from the embodiment described above.

First Alternative Embodiment

Figure 7:
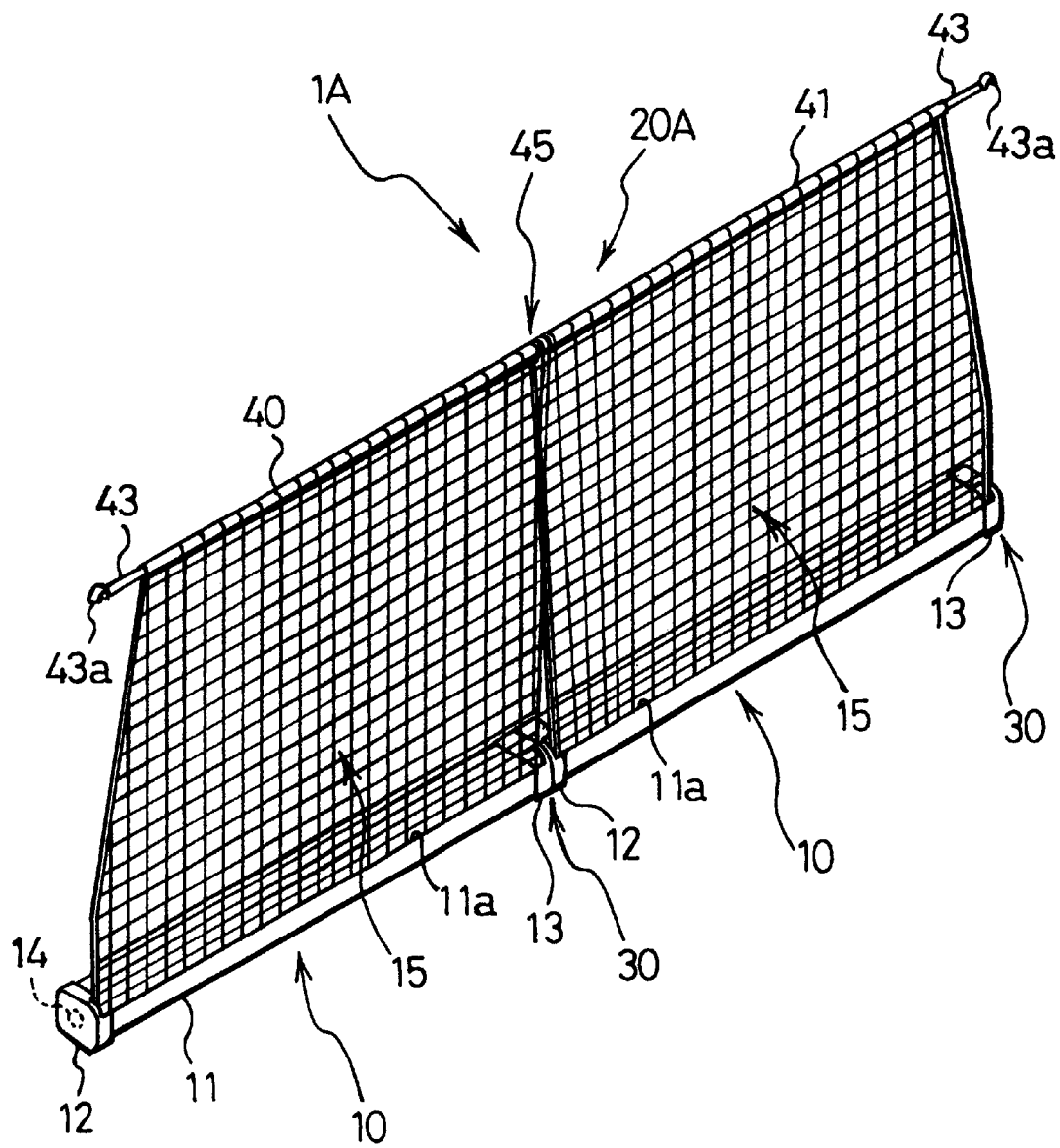
FIG. 7 is a perspective drawing of a partitioning system according to a first alternative embodiment of the present invention.
Figure 8:
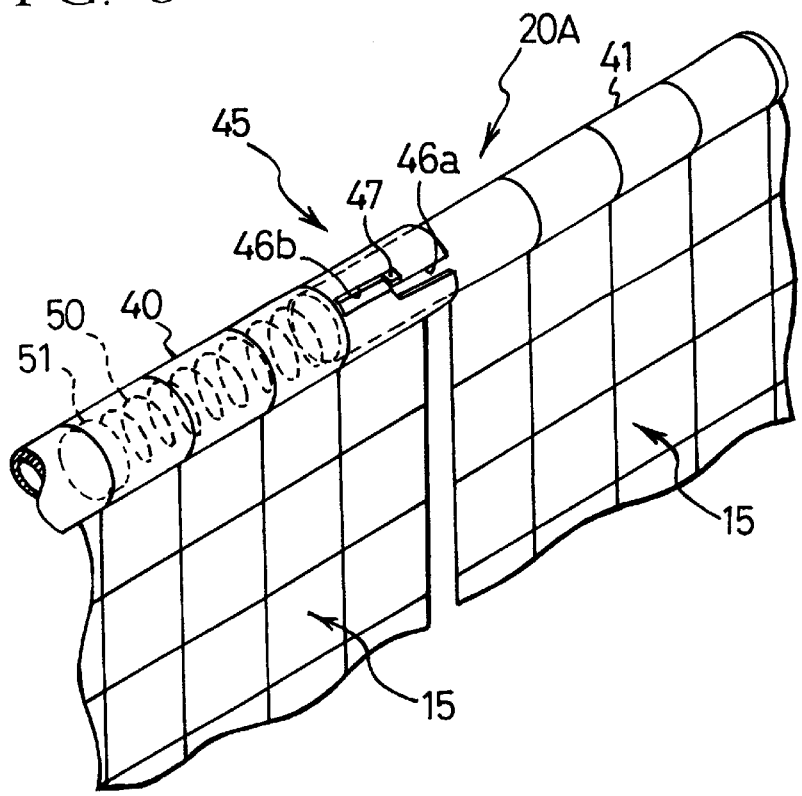
FIG. 8 is a partially cut-away perspective drawing of the partitioning system of FIG. 7.
Figure 9:
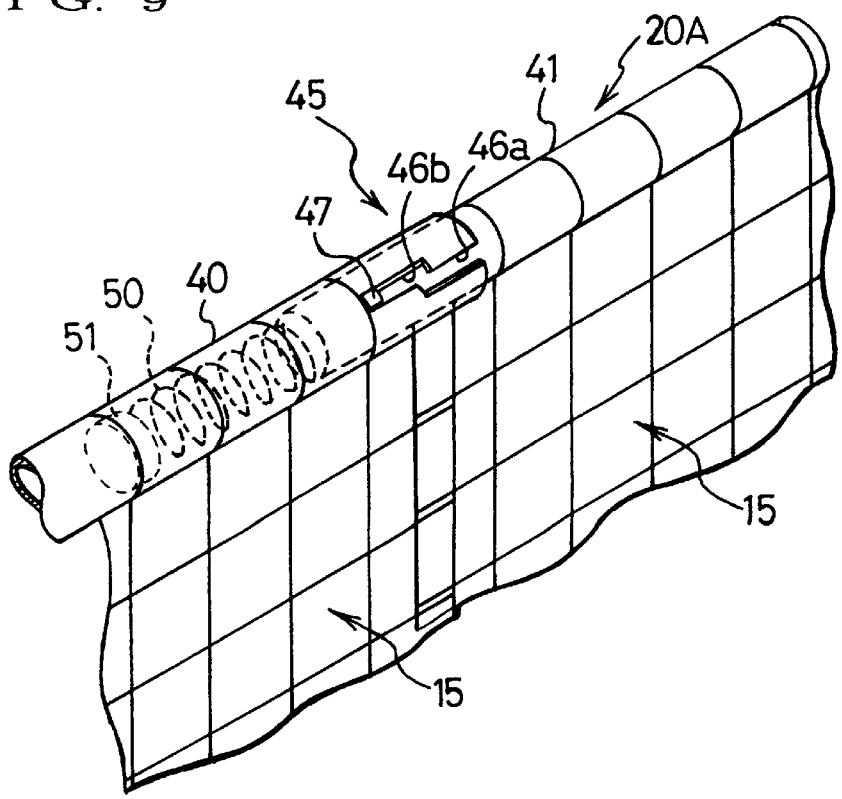
FIG. 9 is a partially cut-away perspective drawing of the partitioning system of FIG. 7.

Referring to FIGS. 7 through 9, in a partitioning system 1A, a pair of attachment sections 40 and 41 of a stay 20A are removably connected through a connecting mechanism 45. When the pair of attachment sections 40 and 41 are connected, the pair of partitioning members 15 partially overlap each other. The pair of attachment sections 40 and 41 are formed as cylinders that have different diameters, allowing them to fit together. A pair of shafts 43 having hooks 43a are fitted and fixed inside the ends of the pair of attachment sections 40 and 41.

Connecting mechanism 45 includes first and second cutouts 46a and 46b, arranged in a staircase arrangement at the end of attachment section 40. Connecting mechanism 45 also includes an engagement projection 47 located at an outer perimeter section of the end of attachment section 41. The pair of attachment sections 40 and 41 fit together from a separated state by fitting the end of attachment section 41 into the end of attachment section 40. This causes engagement projection 47 to engage with first cut-out 46a, thus engaging the ends. Next, attachment sections 40 and 41 are rotated slightly relative to each other, causing engagement projection 47 to engage with second cut-out section 46b, resulting in the pair of attachment sections 40 and 41 being connected so that there is no overlap between the pair of partitioning members 15. Attachment section 41 is further inserted into attachment section 40. Engagement projection 47 engages with the end of second cut-out section 46b so that there is partial overlap in the pair of partitioning members 15, as showing FIG. 3.

Within connecting mechanism 45, a compression spring 50 is fitted and fixed inside attachment section 40. When attachment sections 40 and 41 are connected, spring 50 pushes the sections apart, thus maintaining the state shown in FIG. 8. When hooks 43a at the ends of stay 20A are engaged with the engagement section, spring 50 is in a compressed state so that hooks 43a push against the engagement sections. Since spring 50 is located between attachment sections 40 and 41 in this manner, the pair of partitioning members 15 naturally overlap when stay 20A is attached to the car. When stay 20A is removed, the overlap is eliminated so that there is no obstruction to the rolling up of the pair of partitioning members 15. Spring 50 is fixed to an attachment member 51 fixed and fitted to the inside of attachment section 40.

Partitioning system IA described above provides similar operations and advantages as the first embodiment described above. Furthermore, by allowing the pair of partitioning members 15 to partially overlap so that the gap between the pair of partitioning members is eliminated as much as possible, it is possible to further reliably prevent baggage from going to the passengers side through the gap. By disengaging stay 20A from the engagement sections on the ceiling of the automobile and separating the pair of attachment sections 40 and 41, attachment sections 40 and 41 are integrally supported by seat backs 4. Thus, when partitioning system 1A is not used, the pair of seat backs 4 can be independently reclined. Also, when necessary, only one of the partitioning members 15 can be pulled out and used.

Second Alternative Embodiment

Figure 10:
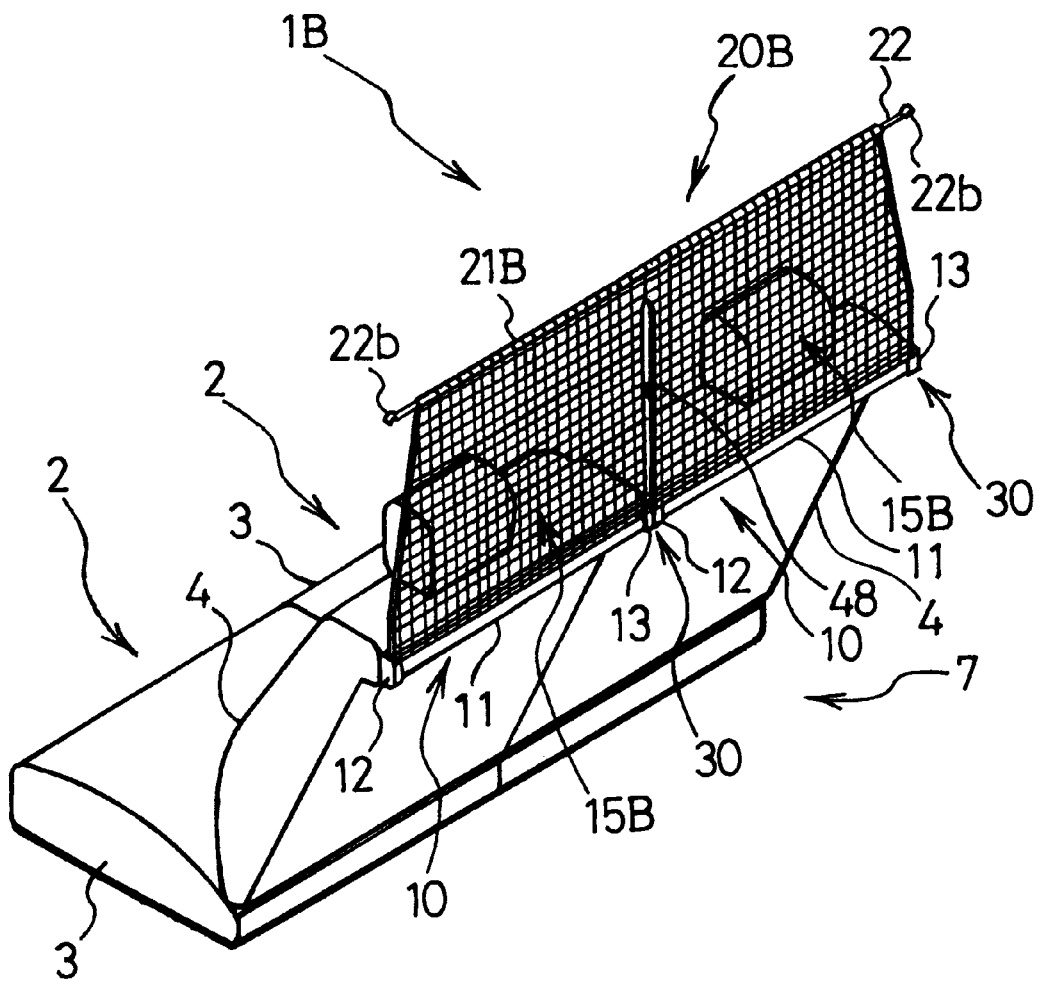
FIG. 10 is a perspective drawing of an automotive rear seat and a partitioning system according to a second alternative embodiment of the present invention.

Referring to FIG. 10, in a partitioning system 1B according to this alternative embodiment, a pair of partitioning members 15B is formed from a single wide partitioning member having a longitudinal slit 48 aligned with the midpoint between the pair of roll-up devices 10. Longitudinal slit 48 extends toward the leading end of partitioning members 15B A stay 20B, including a shaft 22 having hooks 22b formed at both ends, is fixed and fitted inside a cylindrical attachment section 21B attached to the ends of partitioning members 15B.

Partitioning system IB provides approximately the same operation and advantages as the embodiments described above. Furthermore, since the pair of partitioning members 15B is simply a single wide partitioning member on which a slit 48 is formed, production and processing is very simple. Also, in the production of partitioning system 1B, the attachment to stay 20B of the leading end of the pair of partitioning members 15B is likewise simple.

Third Alternative Embodiment

Figure 11:
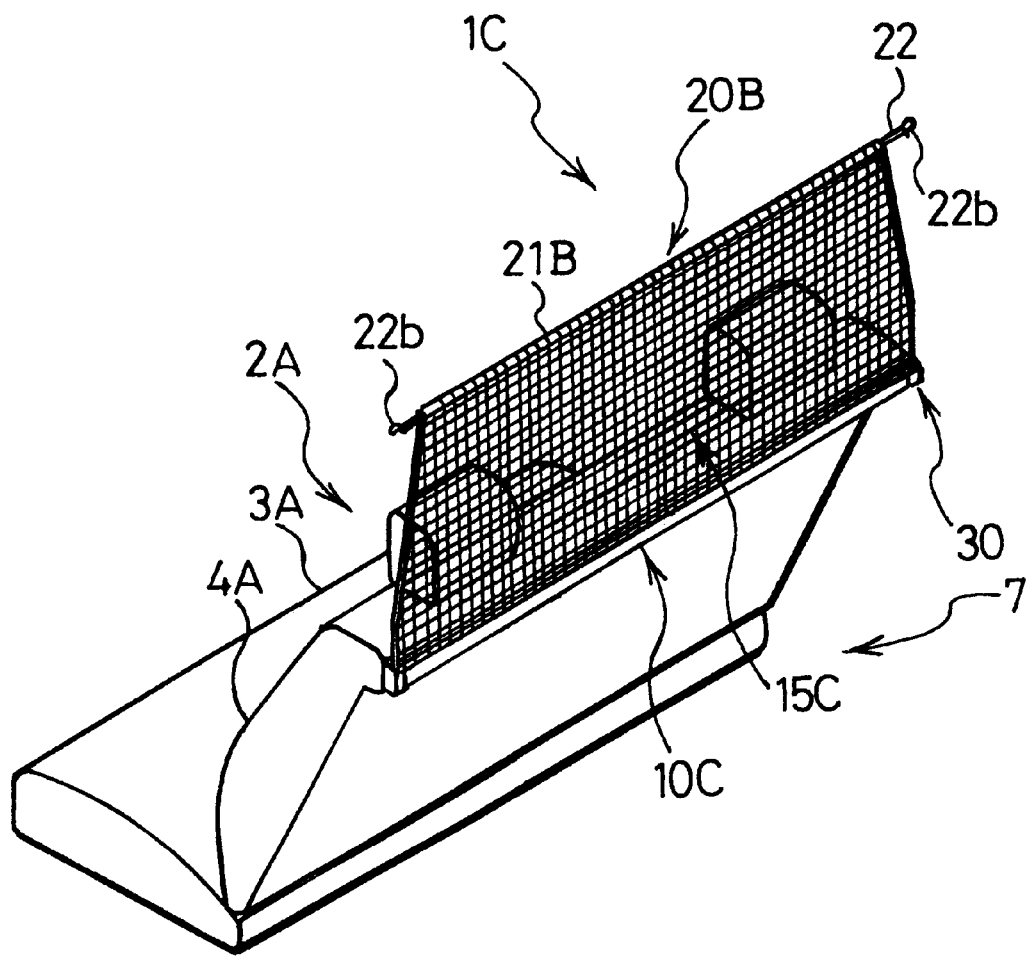
FIG. 11 is a perspective drawing of an automotive rear seat and a partitioning system according to a third alternative embodiment of the present invention.

Referring to FIG. 11, the vehicle in a third alternative embodiment is equipped with a bench seat 2A extending across the entire length of the cabin. Seat 2A includes a seat cushion 3A and a seat back 4A.

A partitioning system 1C includes a roll-up device 10C having a width roughly equal to the width of seat 2. A partitioning member 15C, having a stay 20B fixed to its leading end, is rolled up by roll-up device 10C. Roll-up device 10C includes a lock mechanism 30, preferably toward its right end, fixed to seat back 4. Stay 20B is similar to the stay from the second alternative embodiment described above. Partitioning system 1C provides a very simple structure with fewer elements compared to the embodiment and the alternative embodiments described above. This system is implemented specifically in automobiles equipped with bench seats or seats having non-reclinable seat backs. In partitioning system 1C, it is also possible to have roll-up device 10C fixed to the ceiling of the automobile so that partitioning member 15C is expanded by drawing partitioning member 15C downward, engaging stay 20B to seat back 4.

Fourth Alternative Embodiment

Figure 12:
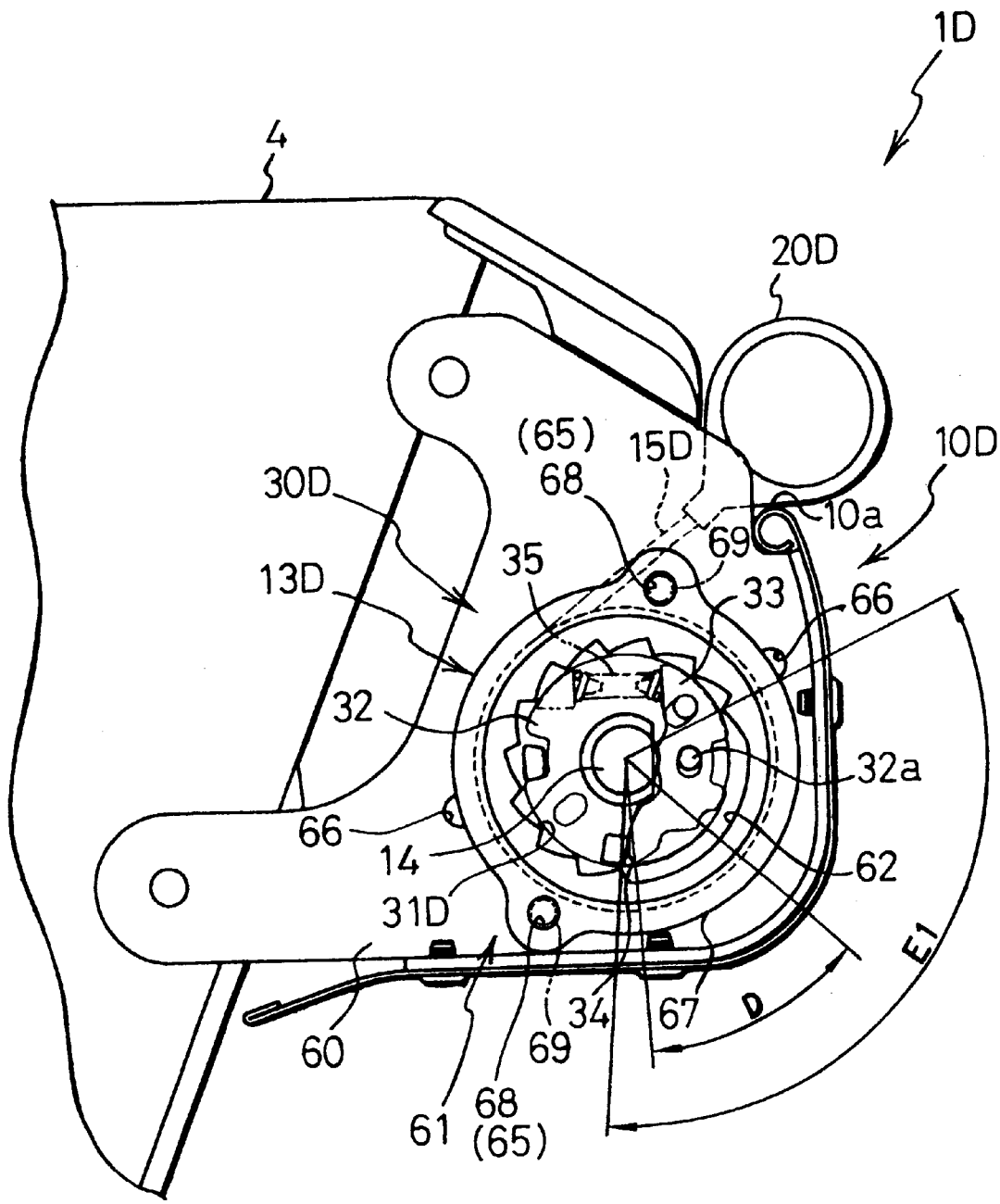
FIG. 12 is an enlarged drawing of a lock mechanism of a fourth alternative embodiment of the present invention.
Figure 13:
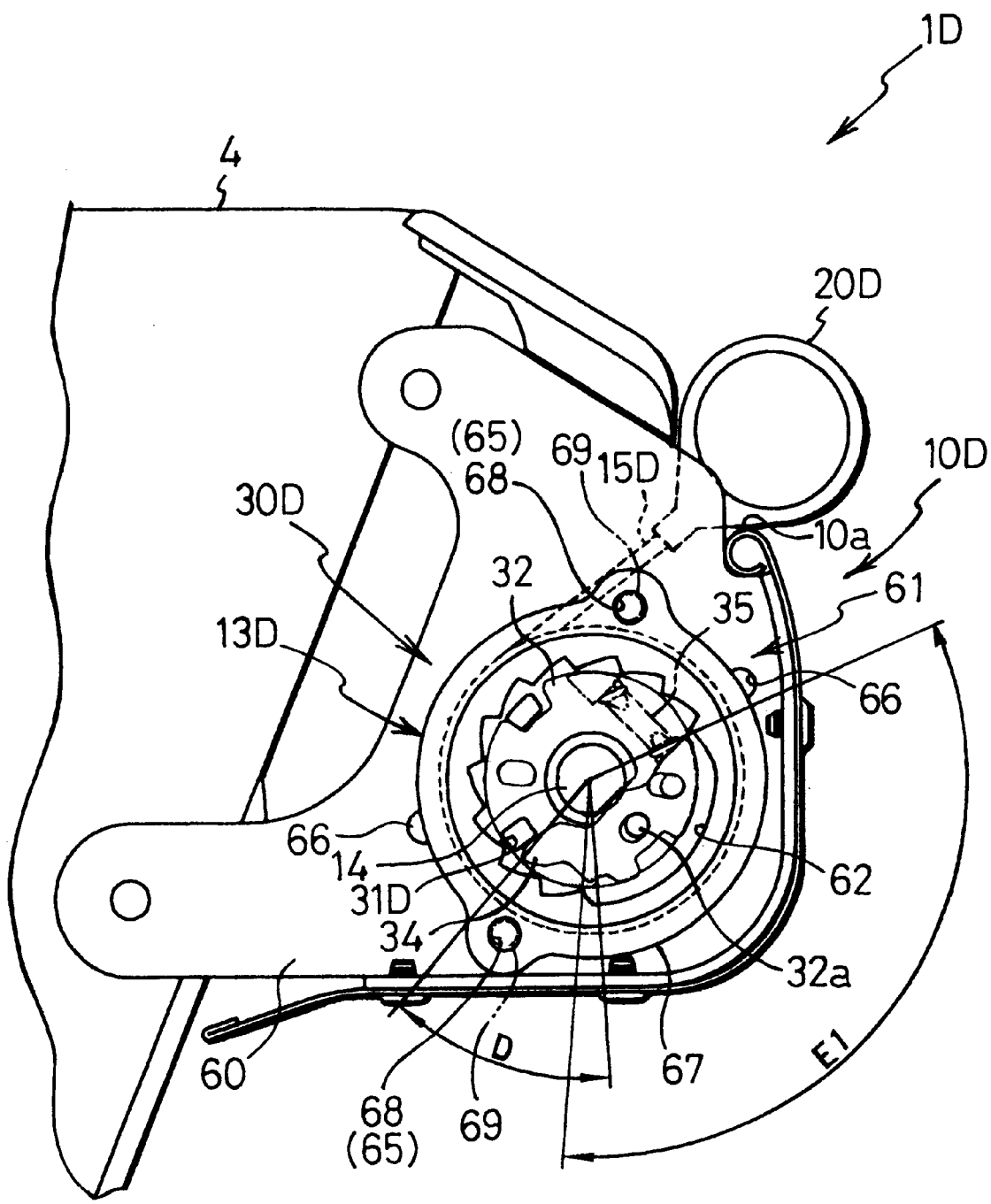
FIG. 13 is an enlarged drawing of the lock mechanism of FIG. 12.
Figure 14:
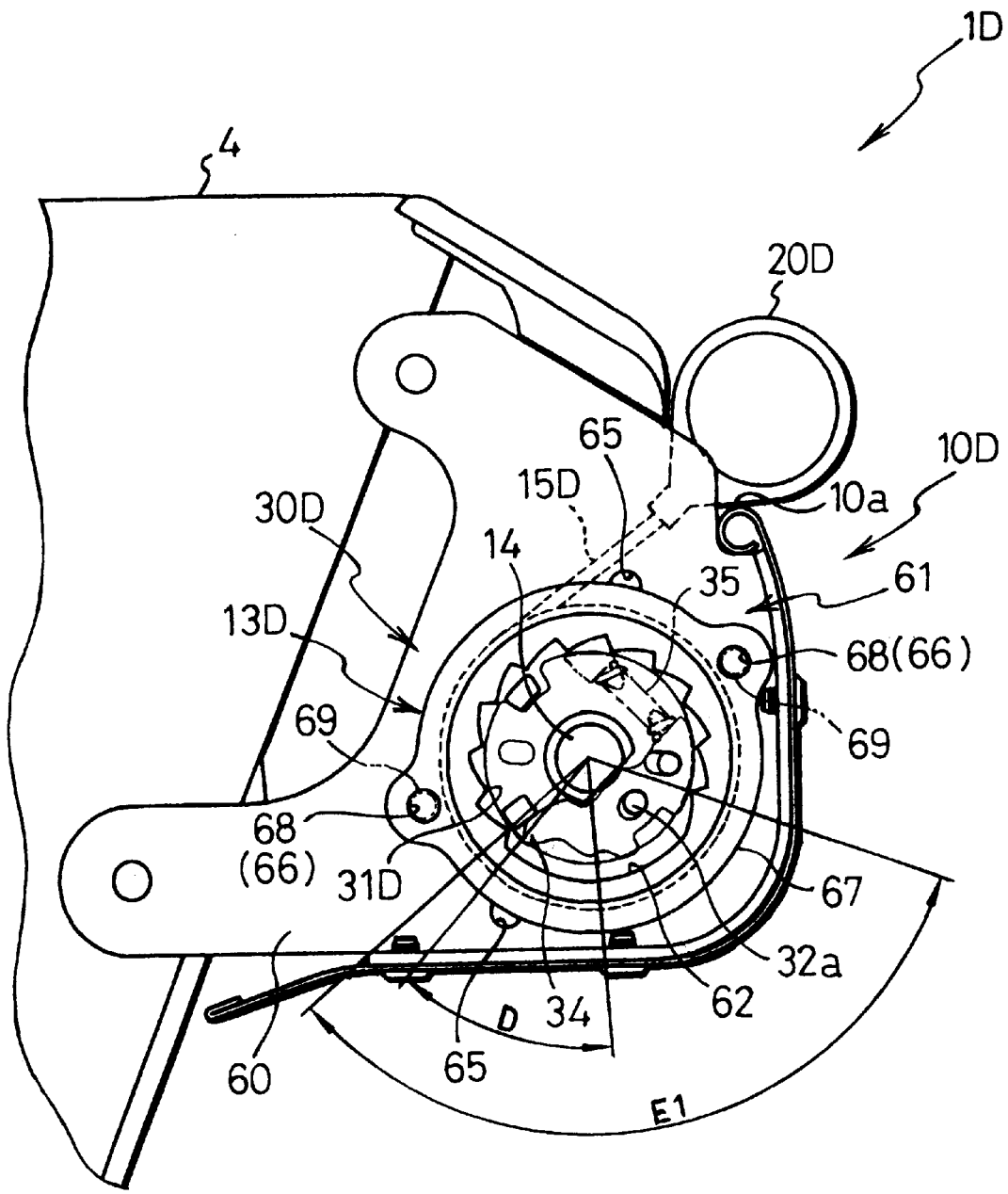
FIG. 14 is an enlarged drawing of the lock mechanism of FIG. 12.

Referring to FIGS. 12 through 14, in a partitioning system 1D according to a fourth alternative embodiment of the present invention, a casing holder 13D attaches to the left end of a roll-up device 10D using an attachment mechanism 61. In a lock mechanism 30D, a cut-out 62 is formed along the perimeter of inner teeth 31D of casing holder 13D. Cut-out 62, formed over a prescribed length extending along the perimeter of inner teeth 31D, has a prescribed angle E1. Prescribed angle E1 is preferably approximately 120 degrees. Cut-out 62 is positioned so that it faces a claw 34 of a lock arm 33 when roll-up device 10D is completely rolled up. This prevents the engagement of claw 34 with inner teeth 31D when partitioning member 15D is completely rolled up and stay 20D is in contact with a webbing opening 10a of roll-up device 10D.

A side plate 60 is formed in an attachment mechanism 61 with a pair of first attachment openings 65 and a pair of second attachment openings 66. First attachment openings 65 serve as a first attachment section for attaching casing holder 13D at a prescribed first orientation. Second attachment openings 66 serve as a second attachment section for attaching casing holder 13D at a prescribed second orientation. The second orientation is offset by a prescribed angle A. Angle A is approximately 45 degrees, relative to the first orientation, where angle A is in the same direction that the partitioning member is drawn out from roll-up shaft 14.

A collar 67 is located at the free end of casing holder 13D. Collar 67 contacts the left surface of side plate 60. A pair of bolt openings 68 are formed on collar 67. Collar 67 is oriented so that bolt openings 68 align with either the first pair of attachment openings 65 or the second pair of attachment openings 66. Collar 67 is then fixed with a pair of bolts 69, fixing casing holder 13D to side plate 60 in either a first orientation or a second orientation.

When partitioning member 15 is completely rolled up, there is a margin of error in the rotational stopping position of claw 34 of lock arm 33 due to factors such as the speed at which partition member 15D is rolled up. Cut-out 62 is formed to face claw 34 when it is within a rotation stopping region D that takes the margin of error into account (e.g., D=45 degrees). This prevents claw 34 of lock arm 33 from engaging with inner teeth 31D of casing holder 13 when partitioning member 15D is completely rolled up.

If casing holder 13D is in the first orientation and rotation stopping region D is within prescribed angle E1, claw 34 will be positioned reliably facing cut-out section 62 when partitioning member 15D is completely rolled up. Thus, claw 34 will not engage with inner teeth 31D.

Referring specifically to FIG. 13, if rotation stopping region D is not positioned within prescribed angle E1 due to margins of error in production, assembly, or the like, attachment mechanism 61 is used to switch casing holder 13D to the second orientation, as shown in FIG. 14, allowing rotation stopping region D to be positioned in prescribed angle E1 and claw 34 to be positioned facing cut-out 62 when partitioning member 15D is completely rolled up.

Whether or not rotation stopping region D is positioned within prescribed angle E1 can be determined by using roll-up device 10D to rapidly roll up partitioning member 15D completely and then forcibly activating lock mechanism 30D. Then, claw 34 can be checked to see if it engages with cut-out 62.

As described above, cut-out 62 is formed at one portion along the perimeter of inner teeth 31D so that claw 34 is facing cut-out 62 when partitioning member 15D is completely rolled up. Thus, if partitioning member 15D is rapidly rolled up completely and roll-up shaft 14 is then stopped, lock arm 34 rotates in opposition to spring 35 due to inertia force. This prevents lock mechanism 30D from locking partitioning member 15D and preventing partitioning member 15D from being pulled out. Furthermore, since casing holder 13D can be attached to main unit member 60 in either the first orientation or the second orientation, claw 34 is reliably positioned facing cut-out section 62 when partitioning member 15D is completely rolled up, even if there is a margin of error due to the production process or the like.

Fifth Alternative Embodiment

Figure 15:
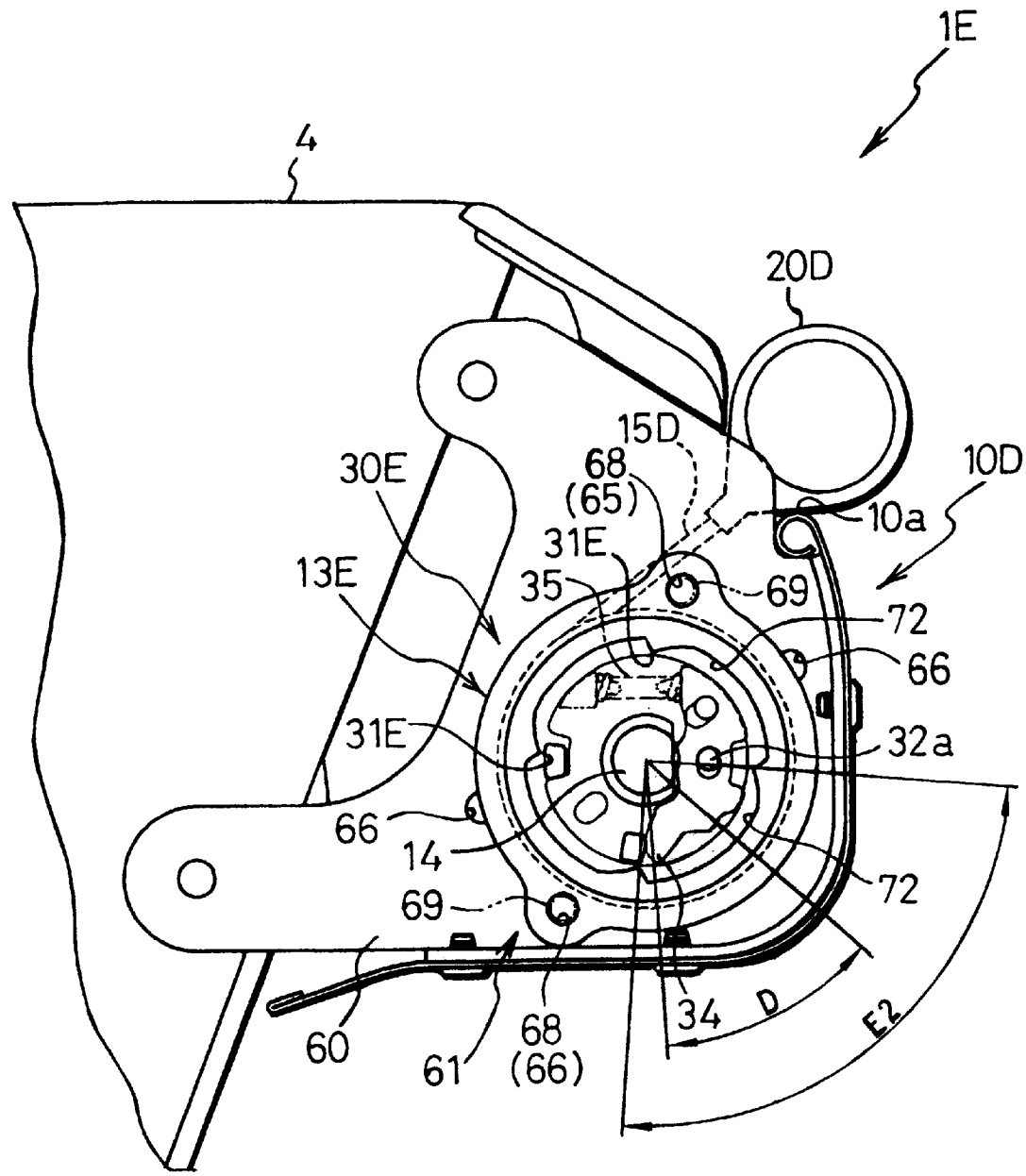
FIG. 15 is an enlarged drawing of the lock mechanism of the fifth alternative embodiment of the present invention.
Figure 16:
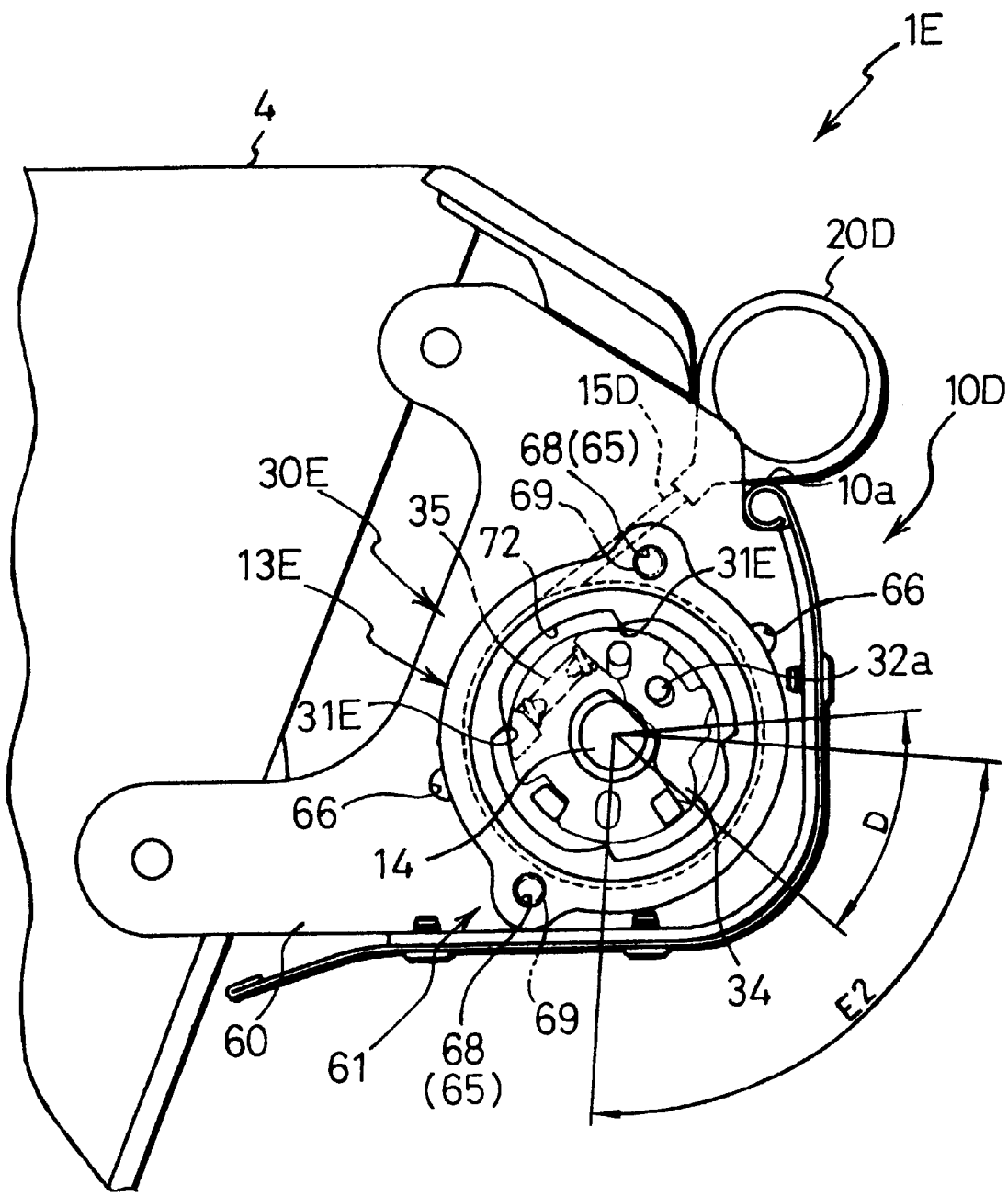
FIG. 16 is an enlarged drawing of the lock mechanism of FIG. 15.
Figure 17:
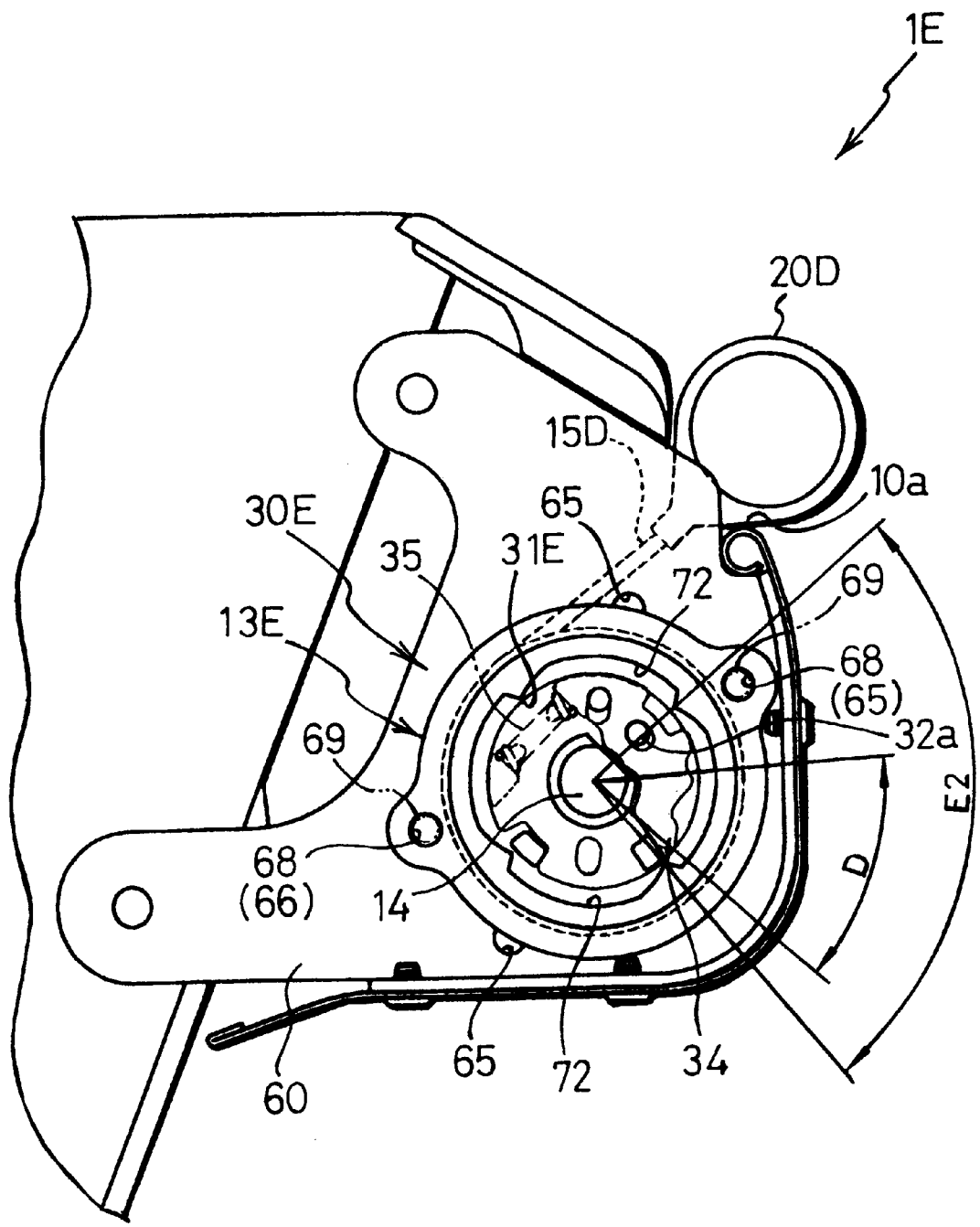
FIG. 17 is an enlarged drawing of the lock mechanism of FIG. 15.

Referring to FIGS. 15 through 17, a partitioning system 1E according to the fifth alternative embodiment of the present invention uses a lock mechanism 30E which is a modified version of lock mechanism 30D of partitioning system 1D from the fourth alternative embodiment. In lock mechanism 30E, four inner teeth 31E are formed on a casing holder 13E at 90-degree intervals. Four cut-outs 72 are formed along a perimeter of inner teeth 31E of casing holder 13E. Cut-outs 72 each have prescribed angles E2 of approximately 90 degrees. Cut-outs 72 are positioned facing claws 34 when partitioning member 15D is completely rolled up. This prevents claw 34 of lock arm 33 from engaging with inner teeth 31E when partitioning member 15D is completely rolled up.

Referring specifically to FIG. 15, when casing holder 13E is in the first orientation and rotation stopping region D is positioned within prescribed angle E2, claws 34 are reliably positioned facing cut-outs 72 if partitioning member 15D is completely rolled up.

Referring specifically to FIG. 16, margins of error due to production, assembly or the like may result in rotation stopping region D not lying in prescribed angle E2. In such cases, attachment mechanism 61 is used to switch casing holder 13E to the second orientation.

Referring specifically to FIG. 17, switching casing holder 13E to the second orientation allows rotation stopping region D to lie in prescribed angle E2 and claws 34 are positioned facing cut-outs 72 when partitioning member 15D is completely rolled up.

Since four cut-outs 72 are formed in gear 31E, if partitioning member 15D is completely rolled up suddenly and then roll-up shaft 14 is stopped, lock arm 34 will rotate in opposition to spring 35 due to inertia force. This opposite rotation prevents lock mechanism 30D from locking partitioning member 15D, allowing partitioning member 15D to be drawn out when next needed.

The partitioning systems 1 and 1A–1E according to the embodiment and the alternative embodiments described above can be implemented in automobiles other than those having a pair of seat backs divided at 6:4 ratios. The partitioning systems can be implemented in automobiles having a pair of seat backs divided at different ratios by changing the lengths of the pair of roll-up devices, the pair of partitioning members, the pair of attachment sections, and the like. Also, with the partitioning systems 1 and 1A–1E, if necessary the partitioning member can be drawn out rearward and the stay can be engaged to the side walls toward the rear of the vehicle, the rear door, or the like, thus allowing the partitioning member to cover the baggage in baggage area 7.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automotive roll-up partitioning system comprising:

a roll-up device having a rotatable roll-up shaft biased to rotate in a direction of retraction;

a casing holder rotatably supporting said roll-up shaft;

a partitioning member, having a base end fixed to said roll-up shaft, being rolled up thereon and extended therefrom;

a lock mechanism detecting a rapid pulling out of said partitioning member and then stopping rotation of said roll-up shaft, thereby stopping rapid pulling out of said partitioning member;

inner teeth integrally formed with said casing holder;

a lock arm base attached to a first end of sail roll-up shaft;

a lock arm pivotably supported on said lock arm base at a position eccentric from an axis of said roll-up shaft;

a claw formed by a portion of said lock arm engagable with said inner teeth;

a sensor spring biasing said lock arm in a direction such that said claw is disengaged from said inner teeth; and an inertia mass applying an inertia force to said lock arm in a direction of engagement between said claw and said inner teeth when said partitioning member is rapidly pulled out from said roll-up device.

2. An automotive roll-up partitioning system according to claim 1, said lock mechanism further comprising:

a cut-out, having a prescribed length, in at least one portion along a perimeter of said inner teeth of said casing holder; and said cut-out being positioned facing said claw when said partitioning member is completely rolled up, thereby preventing said claw of said lock arm from engaging with said inner teeth when said partitioning member is completely rolled up in said roll-up device.

3. An automotive roll-up partitioning system according to claim 2, further comprising:

an attachment mechanism for rotatably fixing said casing holder relative to an axis of said roll-up shaft;

said attachment mechanism having at least first and second attachment sections for attaching said casing holder in at least a first and a second prescribed orientation;

said second prescribed-orientation being offset from said first prescribed orientation by a prescribed angle around said axis of said roll-up shaft, any one of said first prescribed orientation and said second prescribed orientation selectively allowing said cut-out to be positioned facing said claw when said partitioning member is completely rolled up, thereby preventing said claw of said lock arm from engaging with said inner teeth when said partitioning member is completely rolled up in said roll-up device.

4. An automotive roll-up partitioning system according to claim 1 further comprising:

a stay extending through at least a portion of a leading end of said partitioning member, whereby said leading end is prevented from being retracted completely into said roll-up device; and attachment means located at opposite ends of said stay for attaching said leading end to a prescribed position, thereby holding said partitioning member in a retracted position.

5. An automotive roll-up partitioning system according to claim 1, further comprising:

a longitudinal slit in a midpoint position of said partitioning member; and said longitudinal slit extending from a leading end of said partitioning member to an end of said partitioning member attached to said roll-up shaft.

6. An automotive roll-up partitioning system comprising:

first and second roll-up devices having first and second rotatable roll-up shafts biased to rotate in a direction of retraction;

said first roll-up device being attached to a first seat back;

said second roll-up device being attached to a second adjacent seat back;

said first and second seat backs being divided along a lateral direction of a vehicle;

a first casing holder rotatably supporting said first roll-up device;

a second casing holder rotatably supporting said second roll-up device;

first and second partitioning members;

said first partitioning member having a first base end fixed to said first roll-up shaft;

said second partitioning member having a second base end fixed to said second roll-up shaft;

said first and second partitioning members being independently rolled up onto and extended from said first and second roll-up shafts;

a first lock mechanism detecting a rapid pulling out of said first partitioning member and then stopping rotation of said roll-up shaft, thereby stopping said rapid pulling out of said first partition member;

a second lock mechanism detecting a rapid pulling out of said second partitioning member and then stopping rotation of said roll-up shaft, thereby stopping rapid pulling out of said second partitioning member;

inner teeth integrally formed with said first and second casing holder;

first and second lock arm bases attached to a first end of said first and second roll-up shafts;

a first lock arm pivotably supported by said first lock arm base at a position eccentric from an axis of said first roll-up shaft;

a second lock arm pivotably supported by said second lock arm base at a position eccentric from an axis of said second roll-up shaft;

a first claw formed by a portion of said first lock arm engagable with said inner teeth;

a second claw formed by a portion of said second lock arm engagable with said inner teeth;

a first sensor spring biasing said first lock arm in a direction such that said first claw is disengaged from said inner teeth;

a second sensor spring biasing said second lock arm in a direction such that said second claw is disengaged from said inner teeth;

a first inertia mass applying a first inertia force to said first lock arm in a direction of engagement between said first claw and said inner teeth when said first partitioning member is rapidly pulled out from said first roll-up device; and a second inertia mass applying a second inertia force to said second lock arm in a direction of engagement between said second claw and said inner teeth when said second partitioning member is rapidly pulled oat from said second roll-up device.

7. An automotive roll-up partitioning system according to claim 6, said lock mechanism further comprising:

first and second cut-outs, each having a prescribed length, in at least one portion along a perimeter of said inner teeth of said first and second casing holders; and said first and second cut-outs being positioned facing said first and second claws when said first and second partitioning members are completely rolled up, thereby preventing said first and second claws of said first and second lock arms from engaging with said inner teeth when said first and second partitioning members are completely rolled up in said first and second roll-up devices.

8. An automotive roll-up partitioning system according to claim 7, further comprising:

first and second attachment mechanisms for rotatably fixing said first and second casing holders relative to an axis of said first and second roll-up shafts;

said attachment mechanisms each having at least first and second attachment sections for attaching each of said casing holders in at least a first and a second prescribed orientation;

said second prescribed orientation being offset from said first prescribed orientation by a prescribed angle around said axis of each of said roll-up shafts, any one of said first prescribed orientation and said second prescribed orientation selectively allowing each of said cut-out to be positioned facing said claw when said partitioning member is completely rolled up, thereby preventing said claw of said lock arm from engaging with said inner teeth when said partitioning member is completely rolled up in said roll-up device.

9. An automotive roll-up partitioning system according to claim 6, further comprising:

a stay integrally supporting leading ends of each of said first and second partitioning members; and an engagement section on said vehicle engaging said stay when said partitioning members are retracted and installed.

10. An automotive roll-up partitioning system according to claim 9, further comprising:

first and second attachment sections attached to said leading ends of said first and second partitioning members;

said first and second attachment sections being rotatably connected to each other; and said first and second partitioning members overlapping when said stay is engaged with said engagement section on said vehicle.

* * * * *